United States Patent [19]

Rasmussen

[11] 4,273,747
[45] Jun. 16, 1981

[54] PROCESS FOR REMOVAL OF MERCURY VAPOR FROM WASTE GASES

[75] Inventor: Elisabeth L. Rasmussen, Holte, Denmark

[73] Assignee: A/S Niro Atomizer, Soborg, Denmark

[21] Appl. No.: 150,585

[22] Filed: May 16, 1980

[30] Foreign Application Priority Data

May 18, 1979 [DK] Denmark .............................. 2051/79

[51] Int. Cl.$^3$ ........................................... B01D 53/34
[52] U.S. Cl. ................................. 423/210; 423/215.5; 55/72
[58] Field of Search ........... 423/210 M, 210 R, 215.5, 423/531; 55/72

[56] References Cited

U.S. PATENT DOCUMENTS

| | | | |
|---|---|---|---|
| 2,231,309 | 2/1941 | Weber | 423/242 A |
| 3,677,696 | 7/1972 | Bryk et al. | 423/210 |
| 3,855,387 | 12/1974 | Brockmiller et al. | 423/215.5 |

FOREIGN PATENT DOCUMENTS

| | | | |
|---|---|---|---|
| 2641230 | 3/1977 | Fed. Rep. of Germany | 423/210 |
| 2728692 | 2/1978 | Fed. Rep. of Germany | 423/210 |
| 125716 | 10/1972 | Norway | 423/210 |

*Primary Examiner*—Earl C. Thomas
*Attorney, Agent, or Firm*—Schuyler, Banner, Birch, McKie & Beckett

[57] ABSTRACT

Mercury is removed from a stream of hot waste gases by atomizing an aqueous liquid into the hot waste gases in the presence of fly ash suspended in the gas stream. Subsequently the fly ash is separated from the gas stream. A substantial part of the mercury originally present in the gas stream is absorbed or adsorbed by the fly ash so that the stream of the waste gas can safely be discharged to the atmosphere.

4 Claims, 1 Drawing Figure

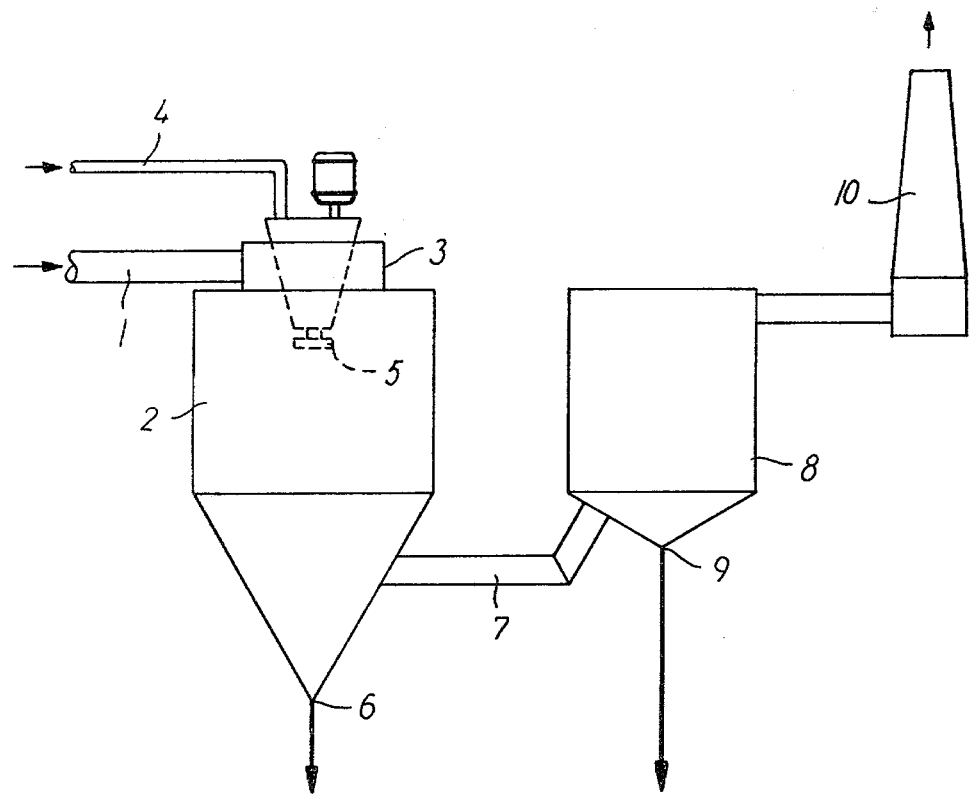

PROCESS FOR REMOVAL OF MERCURY VAPOR FROM WASTE GASES

BACKGROUND OF THE INVENTION

Incineration of certain types of refuse, including domestic refuse, yields an effluent stream of hot waste gases contaminated with mercury. Said stream also contains a certain amount of suspended particles known as fly ash, the composition of which varies, dependent on which type of refuse is being incinerated.

In said gas stream the mercury is present both as a component of the fly ash and as mercury vapor. By usual particle removing cleaning of the gas stream in a collector unit such as an electrostatic precipitator or a bag filter, only that part of the mercury is removed which is a component of the fly ash, whereas the mercury vapor will be emitted to the atmosphere together with the gas stream.

The problems of emitting to the atmosphere such mercury vapor-containing waste gases have long been recognized. However, these problems have not been solved, probably because the mercury vapor in question is diluted in very large amounts of waste gases, which in connection with the high volatility of mercury and mercury compounds make it difficult to prevent said mercury from being emitted to the atmosphere.

DESCRIPTION OF PRIOR ART

Several processes have been suggested for removal and recovery of mercury from gases.

Thus U.S. Pat. No. 3,677,696 teaches washing of the gas with a sulfuric acid solution having a temperature between 70° and 250° C. This process is, however, not suitable for cleaning incinerator waste gas since the handling of such high amounts of hot sulfuric acid as would be necessary for this purpose would cause technical and economical problems.

According to German published patent application No. 2,641,230 the mercury is absorbed by an aqueous solution of ions able to form soluble complexes with mercuric ions, from which solution the mercury is recovered. However, this process is not suitable either for the treatment of incinerator waste gases i.a. because it would involve a more extensive cooling of the waste gases than would be permissible when the latter is to be emitted to the atmosphere.

Norwegian patent specification No. 125,716 and German published patent specification No. 2,728,692 both suggest to pass the gas through a sort of filter in which the mercury is bound by reaction with sulfur or sulfur-containing compounds. The costs of filter material and the fact that a substantial pressure drop exists over such filters are, however, features which make these processes unsuitable for the cleaning of waste gas from incinerator plants.

Consequently there is a need for a low-cost process for removal of mercury vapor present in minor concentrations in large volumes of hot waste gases as is the case in incinerator waste gases.

SUMMARY OF THE INVENTION

The present invention is directed to a novel process for removal of mercury vapor from a stream of fly ash-containing waste gas resulting from the incineration of refuse and having a temperature of at least 200° C. which process is suitable for large-scale treatment of such gases and makes it possible to obtain a substantial reduction of the mercury content therein.

In accordance with the broad aspect of the present invention the novel process comprises the steps of (a) atomizing an aqueous liquid into said stream without previous removal of fly ash therein, said liquid being atomized in a quantity higher than the one which would cool said stream to a temperature of 160° C., but which quantity is lower than the one which would cause incomplete water evaporation from the atomized liquid or result in condensation of water vapor in the subsequent handling of the gas stream; and (b) separating the fly ash together with a substantial part of the mercury initially present as vapor in a collector unit.

The invention is based on the discovery that fly ash is able to reduce the mercury vapor content of the waste gases if they are contacted with fly ash at a sufficiently low temperature. This low temperature is most conveniently obtained by atomizing an aqueous liquid into the hot gases.

It has not been completely clarified, why the process according to the invention is able to reduce substantially the mercury vapor content of the gas stream, but it is assumed that the mercury is bound to the surface of the particles of fly ash by an adsorption process.

As is well known the chemical composition and hence general reactivity of fly ash varies considerably dependent on the origin thereof. However, the ability to bind mercury in the present process is not only possessed by fly ash originating from incineration of a specific type of refuse. In fact none of the different types of incinerator fly ash tested has been without mercury binding properties when used in the process.

It has not been necessary to investigate how much fly ash should be present in the gas stream to ensure that a sufficient reduction of the mercury content will be obtained by the process according to the invention, since it has turned out that the amount of fly ash present in refuse incinerator waste gas before any cleaning thereof will always be sufficient for the purpose of this invention.

The atomization of aqueous liquid in the gas stream may be accomplished by use of any device known per se, which gives an efficient contact between atomized droplets and the gas and the fly ash, and which secure a sufficient residence time for the atomized droplets in the gas stream to obtain a substantially complete water evaporation from said droplets.

It has turned out that a commercial spray drying plant is very suitable for carrying out the process according to the invention.

The atomization may be carried out by means of one or more nozzles or by use of a rotary atomizer wheel.

The composition of the aqueous liquid to be atomized is not critical. The aqueous liquid may be substantially pure water but if this is not readily available an aqueous solution or dispersion may be used provided that it does not contain volatile noxious material, although a certain mercury content may be accepted. This means that the process provides a possibility of getting rid of contaminated waste water, the disposal of which might otherwise cause problems.

It is desired that the mercury-containing fly ash which results from the present process has a basic rather than acidic or neutral character because thereby the risk is reduced for noxious metals, including mercury, being leached from the fly ash when deposited.

Sometimes the refuse to be incinerated has such a composition that the fly ash will get a pronounced basic character. However, often the refuse has a composition which yields a fly ash of acidic or neutral character. In these cases it is preferred to add a basic substance to the aqueous liquid to be atomized with a view to obtain a final powder having basic character and wherein the noxious metals including mercury is well fixed. Preferably hydrated lime ($Ca(OH)_2$) is added to the aqueous liquid.

As indicated above the amount of aqueous liquid which is atomized into the gas stream is adjusted with regard to the fact that a substantial complete water evaporation shall take place to ensure that the fly ash may be recovered from the gas stream as a free flowing dry powder. When the aqueous liquid which is atomized is pure water the minimum temperature of the gas stream after cooling with the aqueous liquid, is 110° C. However, when the aqueous liquid is a lime slurry and the gas stream contains a certain amount of hydrogen chloride the salt calcium chloride will be formed, and this salt is highly hygroscopic, for which reason a higher temperature will be necessary to ensure obtainment of a dry fly ash and in this case the minimum temperature should therefore be 130° C.

The fly ash is separated from the cooled stream of waste gas in a collector known per se for collecting fine particles from a gas stream, for example a bag filter or an electrostatic precipitator.

In the preferred embodiment said separation takes place in a bag filter since this collector device gives a very efficient contact between the gas stream and the fly ash because the gas stream has to pass through a layer of fly ash, which accumulates in the bag filter.

Disposal of the mercury-containing fly ash will usually not require further precautions than those which would have been necessary for disposal of the fly ash even if it has not been used for mercury removal, since the fly ash would also in the latter case usually contain metals which might be harmful.

BRIEF DESCRIPTION OF THE DRAWING

The process according to the invention will be further described with reference to the drawing which is a flow diagram illustrating an embodiment of the process according to the invention.

On the drawing is shown a duct 1 which carries the stream of mercury-containing hot waste gases which are to be cleaned by the process according to the invention. Said gas stream is coming from a refuse incinerator (not shown) and contains fly ash.

The fly ash-containing gas stream is introduced into a spray drier 2 via a ceiling air disperser 3. In case a very large capacity spray drier is used the gas stream is preferably introduced partly through a ceiling air disperser and partly through a central air disperser below the atomizer wheel.

Through a pipe 4 is fed an aqueous liquid, for instance water, to a rotary atomizer wheel 5 in the spray drier.

Thereby the aqueous liquid is atomized to small droplets from which the water evaporates by contact with the hot waste gases in the spray drier and the water evaporation will usually be completed within a dozen of seconds or less.

Due to the heat requirement for said evaporation a substantial cooling of the gases and the fly ash suspended therein takes place in the spray drier.

A minor amount of the fly ash introduced into the spray drier entrained in the gas stream may collect on the conical bottom part thereof and may be removed through an exit 6 in said bottom part. The portion of the fly ash which is removed through 6 will contain some of the mercury originally present as vapor in the gas stream introduced in the spray drier.

The gas stream which has now been cooled leaves the spray drier through a duct 7. Most of the fly ash will still be suspended in the gas stream at this stage and is carried with the gas stream to a collector unit 8 which is preferably a bag filter. In said collector unit the fly ash is separated from the gas stream and since the average residence time for the separated ash is several minutes in said collector unit a sufficient contact is obtained between the cooled gas stream and the collected fly ash, with the result that a substantial part of the mercury is transferred from the gas to the fly ash and is removed together with the latter through an exit 9 of the collector unit 8.

Alternatively the total amount of fly ash may be carried by the gas stream from the spray drier 2 to the collector unit 8 which means that the exit 6 in this case will be disposed with.

The gas from which the fly ash is separated has been freed of most of its mercury content and may be discharged to the atmosphere via a stack 10.

The fly ash which is taken out through the exits 6 and 9 contains the mercury removed from the waste gas. Due to the ratio between the amounts of fly ash and mercury vapor in the gas stream the mercury content of said fly ash will however, often be so low that no other precautions is necessary than those which would anyhow be necessary to dispose the noxious metal-containing fly ash even if it has not been used for mercury adsorption by the process according to the invention.

The process according to the invention is further illustrated by the following examples.

EXAMPLE 1

A pilot plant as the one shown on the drawing was used. The spray drier had a diameter of 1.2 m and the cylindrical portion had a height of 0.8 m. The cone angle was 60°.

The gas stream to be treated was a partial stream comprising app. 430 kg/h humid gases of which app. 100 kg/h was water vapor, and it originated from a domestic refuse incineration plant.

The gas stream introduced through duct 1 had a mercury content of app. 100 $\mu g/Nm^3$ and a temperature of 250° C. The fly ash content was app. 4 $g/Nm^3$.

In the spray drier pure tap water was atomized and evaporated in an amount of 18 l/h which was sufficient to cool the gas stream to 140° C. The cooled gas was led from the spray drier to a bag filter where the fly ash was collected as a free flowing dry powder. The gas, the temperature of which after having left the bag filter was 130° C., was thereafter led to a stack. Analysis of the mercury content of the gas reveiled that in the stream leaving the spray drier the mercury content was reduced to 50 $\mu g/Nm^3$ while said content was reduced further to 10 $\mu g/Nm^3$ in the gas leaving the bag filter. This means that 90% of the mercury vapor originally present in the gas stream was transferred to the fly ash.

EXAMPLE 2

The same pilot plant as the one described in Example 1 was used. The gas stream which originated from a refuse incineration plant amounted to app. 450 kg/h of which app. 150 kg/h was water vapor. During the test the fly ash content varied between 3 and 4 g/Nm$^3$ and the temperature before treatment varied between 246° and 251° C.

In the spray drier an aqueous suspension containing 3.8 percent by weight calcium hydroxide was atomized in an amount of 18.3 kg/h, whereby the temperature of the gas stream was lowered to 126°-130° C. (measured after the bag filter).

The mercury vapor contents of the gas stream before treatment, at the spray drier gas outlet and at the bag filter gas-outlet, resp., were measured at small intervals during more than three hours.

The results are listed below:

| Hour | Before treatment | µg Hg/Nm$^3$ After spray drier | After bag filter |
| --- | --- | --- | --- |
| 09:02 | | | 10.6 |
| 09:07 | 67.2 | 16.0 | |
| 09:14 | 22.5 | | 4.4 |
| 09:24 | 18.0 | 6.2 | |
| 09:29 | 24.9 | | |
| 09:40 | 24.4 | | 4.1 |
| 09:50 | 16.2 | 4.7 | |
| 09:28 | 43.5 | | 4.4 |
| 10:06 | 31.8 | 28.3 | |
| 10:16 | 190.0 | | 5.8 |
| 10:25 | 283.0 | 171.0 | |
| 10:33 | 51.0 | | 3.6 |
| 10:47 | 70.1 | 53.2 | |
| 10:50 | | 39.2 | |
| 11:16 | 20.0 | | 2.1 |
| 11:22 | 209.5 | 59.4 | |
| 11:51 | 12.1 | | |
| 11:55 | 18.0 | 9.9 | |
| 11:59 | 33.3 | 20.4 | |
| 12:02 | 31.3 | | 4.0 |
| 12:06 | 9.0 | | 6.0 |
| 12:08 | 62.4 | | 3.8 |
| Mean values | 61.9 | 40.8 | 4.9 |

These values correspond to an average total reduction of Hg-vapor contents better than 92%.

The collected fly ash was a dry free flowing powder giving basic reaction when suspended in water.

EXAMPLE 3

The plant and the procedure were the same as in Example 2 except as follows:

The amount of gas was 430 kg/h including 100 kg/h water vapor. The gas temperature before treatment varied between 245° and 250° C. and the exit temperature from the bag filter was 126°-128° C. 18.0 kg/h tap water, without any calcium hydroxide addition, was atomized.

The following results were obtained:

| Hour | Before treatment | µg Hg/Nm$^3$ After spray drier | After bag filter |
| --- | --- | --- | --- |
| 09:37 | 36.9 | 18.5 | |
| 09:44 | 17.5 | | 4.4 |
| 09:50 | 14.8 | 9.9 | |
| 09:57 | 68.2 | | 3.9 |
| 10:04 | 38.4 | 20.6 | |
| 10:11 | 327 | | 6.2 |
| 10:45 | 23.1 | 8.8 | |
| 10:52 | 55.2 | | 3.8 |
| 10:57 | 429 | 212 | |
| 11:05 | 93.3 | | 5.2 |

These results show that a very efficient Hg-removal takes place even when the Hg-contents of the gas to be treated reach peak values.

EXAMPLE 4

The plant and the procedure were the same as in Example 2 except as follows:

Gas temperature before treatment 238°-250° C. Gas temperature downstream bag filter 120°-131° C. Instead of pure tap water a 2.2% by weight aqueous suspension of calcium hydroxide was atomized.

The following results were obtained:

| Hour | Before treatment | µg Hg/Nm$^3$ After spray drier | After bag filter |
| --- | --- | --- | --- |
| 12:30 | 40.9 | 16.7 | |
| 12:35 | 26.0 | | 2.6 |
| 12:40 | 73.6 | 31.8 | |
| 12:45 | 26.8 | | 2.7 |
| 12:50 | 57.9 | 45.5 | |
| 12:55 | 9.4 | | 3.9 |
| 13:00 | 51.2 | 13.9 | |
| 13:05 | 95.0 | | 4.8 |
| 13:13 | 45.9 | 15.6 | |
| 13:17 | 28.7 | | 2.9 |
| 13:45 | 43.0 | 24.0 | |
| 13:50 | 49.7 | | 3.8 |
| 14:00 | 25.5 | 15.2 | |
| 14:05 | 57.1 | | 4.4 |
| 14:12 | 85.5 | 55.5 | |
| 14:16 | 23.6 | | 6.4 |
| 14:24 | 61.7 | 30.2 | |
| 14:29 | 31.4 | | 5.3 |
| 14:33 | 105 | 40.3 | |
| 14:40 | 13.6 | | 3.1 |

I claim:
1. A process for removal of mercury vapor from a stream of fly ash-containing waste gas resulting from the incineration of refuse, said stream having a temperature of at least 200° C., comprising the steps of
   (a) atomizing an aqueous liquid into said stream without previous removal of fly ash therein, said liquid being atomized in a quantity higher than the one which would cool said stream to a temperature of 160° C., but which quantity is lower than the one which would give incomplete water evaporation from the atomized liquid or condensation of water vapor in subsequent handling of the gas stream, and
   (b) separating the fly ash together with a substantial part of the mercury originally present as vapor in a particle collector unit.
2. A process according to claim 1 wherein the aqueous liquid which is atomized is water, and the quantity used thereof is selected to cool the gas stream to a temperature between 110° C. and 160° C.
3. A process according to claim 1 wherein the aqueous liquid which is atomized is an aqueous calcium hydroxide suspension, and the quantity used thereof is selected to cool the gas stream to a temperature between 130° and 160° C.
4. A process according to claim 1 wherein the separation of the mercury-containing fly ash takes place in a bag filter.

* * * * *